US009429006B2

(12) United States Patent
Brannon et al.

(10) Patent No.: US 9,429,006 B2
(45) Date of Patent: *Aug. 30, 2016

(54) METHOD OF ENHANCING FRACTURE CONDUCTIVITY

(71) Applicants: Harold Dean Brannon, Magnolia, TX (US); Brian N. Ward, The Woodlands, TX (US); D. V. Satyanarayana Gupta, The Woodlands, TX (US); Scott Gregory Nelson, Edmond, OK (US)

(72) Inventors: Harold Dean Brannon, Magnolia, TX (US); Brian N. Ward, The Woodlands, TX (US); D. V. Satyanarayana Gupta, The Woodlands, TX (US); Scott Gregory Nelson, Edmond, OK (US)

(73) Assignee: Baker Hughes Incorporated, Houston, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/285,355

(22) Filed: May 22, 2014

(65) Prior Publication Data

US 2014/0251610 A1    Sep. 11, 2014

Related U.S. Application Data

(63) Continuation-in-part of application No. 13/782,952, filed on Mar. 1, 2013, now Pat. No. 8,739,878.

(51) Int. Cl.
*E21B 43/267* (2006.01)
*C09K 8/68* (2006.01)

(52) U.S. Cl.
CPC .............. *E21B 43/267* (2013.01); *C09K 8/68* (2013.01); *C09K 2208/24* (2013.01); *C09K 2208/26* (2013.01); *C09K 2208/30* (2013.01)

(58) Field of Classification Search
CPC  C09K 8/68; C09K 2208/30; C09K 2208/26; C09K 8/80; C09K 8/62; C09K 8/685; C09K 8/602; C09K 8/665; C09K 8/506; E21B 43/267; E21B 43/26; E21B 43/025; E21B 43/261

See application file for complete search history.

(56) References Cited

U.S. PATENT DOCUMENTS

| 2,596,843 A | 5/1952 | Farris |
| 2,966,457 A | 12/1960 | Starmann et al. |
| 3,089,542 A | 5/1963 | Kolodny |
| 3,149,673 A | 9/1964 | Pennington |
| 3,149,674 A | 9/1964 | Schutze et al. |
| 3,175,615 A | 3/1965 | East |
| 3,254,717 A | 6/1966 | Huitt et al. |
| 3,266,573 A | 8/1966 | Rixe |
| 3,335,796 A | 8/1967 | Parker, Jr. |
| 3,492,147 A | 1/1970 | Young |
| 3,659,651 A | 5/1972 | Graham |
| 3,888,311 A | 6/1975 | Cooke |
| 3,929,191 A | 12/1975 | Graham et al. |
| 3,937,283 A | 2/1976 | Blauer et al. |
| 4,051,900 A | 10/1977 | Hankins |
| 4,074,760 A | 2/1978 | Copeland et al. |
| 4,078,610 A | 3/1978 | Arnold |
| 4,195,010 A | 3/1980 | Russell et al. |
| 4,216,829 A | 8/1980 | Murphey |
| 4,421,167 A | 12/1983 | Erbstoesser et al. |
| 4,439,489 A | 3/1984 | Johnson et al. |
| 4,462,466 A | 7/1984 | Kachnik |
| 4,493,875 A | 1/1985 | Beck |
| 4,502,967 A | 3/1985 | Conway |
| 4,506,734 A | 3/1985 | Nolte |
| 4,547,468 A | 10/1985 | Jones et al. |
| 4,585,064 A | 4/1986 | Graham et al. |
| 4,632,876 A | 12/1986 | Laird et al. |
| 4,654,266 A | 3/1987 | Kachnik |
| 4,680,230 A | 7/1987 | Gibb et al. |
| 4,717,594 A | 1/1988 | Graham et al. |
| 4,733,729 A | 3/1988 | Copeland |
| 4,796,701 A | 1/1989 | Hudson et al. |
| 4,829,100 A | 5/1989 | Murphey et al. |
| 4,830,794 A | 5/1989 | Edgley et al. |
| 4,840,729 A | 6/1989 | Levine |
| 4,869,960 A | 9/1989 | Gibb et al. |
| 4,875,525 A | 10/1989 | Manna |
| 4,887,670 A | 12/1989 | Lord et al. |
| 4,888,240 A | 12/1989 | Graham et al. |

(Continued)

FOREIGN PATENT DOCUMENTS

| CA | 2329834 A1 | 6/2002 |
| EP | 0308257 A2 | 3/1989 |
| EP | 1 023 382 B1 | 8/2006 |
| GB | 2319796 B | 3/1998 |
| WO | 02/26656 A1 | 4/2002 |
| WO | 2013158308 A1 | 10/2013 |
| WO | 2013188413 A1 | 12/2013 |

OTHER PUBLICATIONS

U.S. Appl. No. 11/971,811, filed Jan. 9, 2008, Brannon et al.

(Continued)

*Primary Examiner* — Zakiya W Bates
(74) *Attorney, Agent, or Firm* — John Wilson Jones; Jones & Smith, LLP

(57) ABSTRACT

The method includes the introduction of a proppant-free stage and a proppant laden stage into the wellbore and/or subterranean formation. The method increases the effective fracture width and enhances fracture conductivity within the formation. Either the proppant-free stage or the proppant laden stage contains a breaker. At least one of the proppant-free stage or proppant laden stage contains a viscosifying agent to which the breaker has affinity. The viscosifying agent may be a superabsorbent, a viscosifying polymer (other than a superabsorbent) or a viscoelastic surfactant. The breaker has greater affinity for the viscosifying agent not present in the same stage as the breaker. Either the proppant-free stage or the proppant laden stage may be foamed.

26 Claims, No Drawings

(56) References Cited

U.S. PATENT DOCUMENTS

| | | |
|---|---|---|
| 4,921,820 A | 5/1990 | Rumpf et al. |
| 4,923,714 A | 5/1990 | Gibb et al. |
| 5,069,283 A | 12/1991 | Mack |
| 5,103,905 A | 4/1992 | Brannon et al. |
| 5,175,133 A | 12/1992 | Smith et al. |
| 5,201,370 A | 4/1993 | Tjon Joe-Pin |
| 5,240,654 A | 8/1993 | Smith et al. |
| 5,305,832 A | 4/1994 | Gupta et al. |
| 5,330,005 A | 7/1994 | Card et al. |
| 5,422,183 A | 6/1995 | Sinclair et al. |
| 5,425,421 A | 6/1995 | Coleman et al. |
| 5,435,391 A | 7/1995 | Jones |
| 5,439,055 A | 8/1995 | Card et al. |
| 5,443,633 A | 8/1995 | Hirsbrunner et al. |
| 5,492,178 A | 2/1996 | Nguyen |
| 5,501,275 A | 3/1996 | Card et al. |
| 5,515,920 A | 5/1996 | Luk et al. |
| 5,547,506 A | 8/1996 | Rae et al. |
| 5,551,344 A | 9/1996 | Couet et al. |
| 5,562,160 A | 10/1996 | Brannon et al. |
| 5,582,249 A | 12/1996 | Caveny et al. |
| 5,597,784 A | 1/1997 | Sinclair et al. |
| 5,604,184 A | 2/1997 | Ellis et al. |
| 5,699,860 A | 12/1997 | Grundmann |
| 5,799,734 A | 9/1998 | Norman et al. |
| 5,837,656 A | 11/1998 | Sinclair |
| 5,908,073 A | 6/1999 | Nguyen et al. |
| 5,916,933 A | 6/1999 | Johnson et al. |
| 5,921,317 A | 7/1999 | Dewprashad et al. |
| 5,924,488 A | 7/1999 | Nguyen et al. |
| 5,948,734 A | 9/1999 | Sinclair |
| 5,950,727 A | 9/1999 | Irani |
| 5,955,144 A | 9/1999 | Sinclair et al. |
| 5,960,878 A | 10/1999 | Nguyen et al. |
| 5,964,289 A | 10/1999 | Hill |
| 5,964,291 A | 10/1999 | Bourne et al. |
| 6,047,772 A | 4/2000 | Weaver et al. |
| 6,070,666 A | 6/2000 | Montgomery |
| 6,079,492 A | 6/2000 | Hoogteerjling et al. |
| 6,114,410 A | 9/2000 | Betzold |
| 6,116,342 A | 9/2000 | Clark et al. |
| 6,138,760 A | 10/2000 | Lopez et al. |
| 6,172,011 B1 | 1/2001 | Card et al. |
| 6,194,355 B1 | 2/2001 | Jarrett et al. |
| 6,209,643 B1 | 4/2001 | Nguyen et al. |
| 6,211,120 B1 | 4/2001 | Welch et al. |
| 6,230,805 B1 | 5/2001 | Verdaemer et al. |
| 6,248,838 B1 | 6/2001 | Albright |
| 6,311,773 B1 | 11/2001 | Todd et al. |
| 6,315,041 B1 | 11/2001 | Carlisle |
| 6,328,105 B1 | 12/2001 | Betzold |
| 6,348,629 B1 | 2/2002 | Albright |
| 6,372,678 B1 | 4/2002 | Youngman et al. |
| 6,406,789 B1 | 6/2002 | McDaniel et al. |
| 6,410,489 B1 | 6/2002 | Zhang et al. |
| 6,439,309 B1 | 8/2002 | Matherly et al. |
| 6,439,310 B1 | 8/2002 | Scott, III et al. |
| 6,451,953 B1 | 9/2002 | Albright |
| 6,503,676 B2 | 1/2003 | Yamashita et al. |
| 6,528,157 B1 | 3/2003 | Mc Daniel et al. |
| 6,541,579 B2 | 4/2003 | Albright |
| 6,579,947 B2 | 6/2003 | Heitz et al. |
| 6,632,527 B1 | 10/2003 | McDaniel |
| 6,640,897 B1 | 11/2003 | Misselbrook et al. |
| 6,667,261 B1 | 12/2003 | Anshits et al. |
| 6,705,400 B1 | 3/2004 | Nguyen et al. |
| 6,725,931 B2 | 4/2004 | Nguyen et al. |
| 6,742,590 B1 | 6/2004 | Nguyen |
| 6,749,025 B1 | 6/2004 | Brannon et al. |
| 6,766,817 B2 | 7/2004 | Dias da Silva |
| 6,830,105 B2 | 12/2004 | Theising et al. |
| 6,875,728 B2 | 4/2005 | Gupta et al. |
| 7,001,872 B2 | 2/2006 | Pyecroft et al. |
| 7,036,590 B2 | 5/2006 | Harris |
| 7,036,591 B2 | 5/2006 | Canan et al. |
| 7,036,597 B2 | 5/2006 | O'Brien et al. |
| 7,066,258 B2 | 6/2006 | Justus et al. |
| 7,086,460 B2 | 8/2006 | Nguyen |
| 7,115,546 B2 | 10/2006 | Qu et al. |
| 7,144,844 B2 | 12/2006 | Qu et al. |
| 7,205,264 B2 | 4/2007 | Boles |
| 7,207,386 B2 | 4/2007 | Brannon et al. |
| 7,210,528 B1 | 5/2007 | Brannon et al. |
| 7,226,971 B2 | 6/2007 | Ramesh et al. |
| 7,270,879 B2 | 9/2007 | McCrary |
| 7,316,275 B2 | 1/2008 | Wang et al. |
| 7,322,411 B2 | 1/2008 | Brannon et al. |
| 7,361,693 B2 | 4/2008 | Albright et al. |
| 7,426,961 B2 | 9/2008 | Stephenson et al. |
| 7,625,845 B2 | 12/2009 | Wang et al. |
| 7,713,917 B2 | 5/2010 | Wang et al. |
| 7,762,332 B2 | 7/2010 | Lopez et al. |
| 7,851,415 B2 | 12/2010 | Nelson et al. |
| 7,923,419 B2 | 4/2011 | Qu et al. |
| 7,946,345 B2 | 5/2011 | Nguyen |
| 8,205,675 B2 * | 6/2012 | Brannon et al. ............ 166/308.3 |
| 8,408,305 B2 | 4/2013 | Brannon et al. |
| 8,490,707 B2 | 7/2013 | Robbison et al. |
| 8,739,878 B2 * | 6/2014 | Brannon et al. ............ 166/308.3 |
| 2003/0224165 A1 | 12/2003 | Anderson et al. |
| 2004/0023812 A1 | 2/2004 | England et al. |
| 2004/0023818 A1 | 2/2004 | Nguyen et al. |
| 2004/0040708 A1 | 3/2004 | Stephenson et al. |
| 2004/0138071 A1 | 7/2004 | Gupta et al. |
| 2004/0206497 A1 | 10/2004 | Gonzalez et al. |
| 2004/0244978 A1 | 12/2004 | Shaarpour |
| 2005/0016732 A1 | 1/2005 | Brannon et al. |
| 2005/0028976 A1 | 2/2005 | Nguyen et al. |
| 2005/0113264 A1 | 5/2005 | Vollmer |
| 2005/0244641 A1 | 11/2005 | Vincent |
| 2005/0272612 A1 | 12/2005 | Dawson et al. |
| 2006/0065398 A1 | 3/2006 | Brannon et al. |
| 2006/0073980 A1 | 4/2006 | Brannon et al. |
| 2006/0258546 A1 | 11/2006 | Brannon et al. |
| 2007/0087941 A1 | 4/2007 | Cawiezel |
| 2007/0173417 A1 | 7/2007 | Kaufman et al. |
| 2007/0209794 A1 | 9/2007 | Kaufman et al. |
| 2007/0209795 A1 | 9/2007 | Gupta et al. |
| 2007/0270316 A1 | 11/2007 | El Shaari et al. |
| 2008/0087429 A1 | 4/2008 | Brannon et al. |
| 2008/0108524 A1 | 5/2008 | Willberg et al. |
| 2008/0176773 A1 | 7/2008 | Wheeler et al. |
| 2008/0179057 A1 | 7/2008 | Dawson |
| 2008/0182761 A1 | 7/2008 | Stephenson et al. |
| 2008/0190603 A1 | 8/2008 | Brannon |
| 2008/0190619 A1 | 8/2008 | Brannon et al. |
| 2008/0269082 A1 | 10/2008 | Wilson et al. |
| 2009/0044945 A1 | 2/2009 | Willberg et al. |
| 2009/0075845 A1 | 3/2009 | Abad et al. |
| 2011/0036583 A1 | 2/2011 | Willberg et al. |
| 2012/0015852 A1 | 1/2012 | Quintero et al. |
| 2013/0000900 A1 | 1/2013 | Kalgaonkar et al. |
| 2013/0056213 A1 | 3/2013 | Medvedev et al. |
| 2013/0096038 A1 | 4/2013 | Kim et al. |
| 2014/0000891 A1 | 1/2014 | Mahoney et al. |
| 2014/0060826 A1 | 3/2014 | Nguyen |
| 2014/0060827 A1 | 3/2014 | Nguyen et al. |
| 2014/0060832 A1 | 3/2014 | Mahoney et al. |

OTHER PUBLICATIONS

U.S. Appl. No. 12/013,775, filed Jan. 14, 2008, Kaufman et al.
U.S. Appl. No. 11/952,847, filed Dec. 7, 2007, Dajani et al.
U.S. Appl. No. 12/129,478, filed May 29, 2008, Le et al.
U.S. Appl. No. 12/180,219, filed Jul. 25, 2008, Wheeler et al.
Wood, et al; Ultra-Lightweight Proppant Development Yields Exciting New Opportunities in Hydraulic Fracturing Design; SPE 84309; Society of Petroleum Engineers, Inc.; 2003.
Gupta et al; The History and Success of Liquid CO2 and CO2/N2 Fracturing System; SPE 40016; Society of Petroleum Engineers, Inc.; 1998.
Wolhart, Stephen; Advanced Hydraulic Fracture Diagnostics Optimize Development in the Bossier Sands; WorldOil Magazine, vol. 226 No. 7; Jul. 2005.

(56) References Cited

OTHER PUBLICATIONS

Liu et al; Proppant Placement Using Reverse-Hybrid Fracs; SPE 99580-PA; Society of Petroleum Engineers, Inc.; 2007.
D.V. Satyanarayana Gupta, Jimie Devon Lemons, William D. Holcomb, Harold Dean Brannon; "Method for Optimizing Conductivity in a Hydraulic Fracturing Operation"; U.S. Appl. No. 61/882,858, filed Sep. 26, 2013.

Jia Zhou, Hong Sun, Qi Qu, Michael Guerin; "Hydraulic Fracturing Composition, Method for Making and Use of Same"; U.S. Appl. No. 13/888,457, filed May 7, 2013.
Jia Zhou, Qi Qu, Scott G. Nelson, Hong Sun, Leiming Li; "Hydraulic Fracturing Composition, Method for Making and Use of Same"; U.S. Appl. No. 14/169,698, filed Jan. 31, 2014.

\* cited by examiner

METHOD OF ENHANCING FRACTURE CONDUCTIVITY

This application is a continuation-in-part application of U.S. patent application Ser. No. 13/782,952, filed on Mar. 1, 2013 (herein incorporated in its entirety), which is a continuation application of U.S. patent application Ser. No. 13/491,837, filed on Jun. 8, 2012, now U.S. Pat. No. 8,408,305, which is a continuation of U.S. patent application Ser. No. 12/248,773, filed on Oct. 9, 2008, now U.S. Pat. No. 8,205,675.

FIELD OF THE DISCLOSURE

The disclosure relates to a method of stimulating a subterranean formation in at least two stages. One stage contains a proppant-free fluid and another stage contains a proppant laden slurry. At least one of the stages contains a breaker which has affinity for a viscosifying agent present in the other stage.

BACKGROUND

Hydraulic fracturing is a common stimulation technique used to enhance production of fluids from subterranean formations. Hydraulic fracturing is typically used to stimulate low permeability formations where recovery efficiency is limited.

During hydraulic fracturing, a fracturing fluid is pumped at high pressures and high rates into a wellbore penetrating a subterranean formation to initiate and propagate a fracture in the formation. Well productivity depends on the ability of the fracture to conduct fluids from the formation to the wellbore. The treatment design generally requires the fluid to reach maximum viscosity as it enters the fracture which affects the fracture length and width. The requisite viscosity is typically obtained by the gellation of viscosifying polymers and/or surfactants in the fracturing fluid. The gelled fluid is typically accompanied by a proppant which results in placement of the proppant within the produced fracture.

Once the fracture is initiated, subsequent stages of fracturing fluid containing proppant are pumped into the created fracture. The fracture generally continues to grow during pumping and the proppant remains in the fracture in the form of a permeable "pack" that serves to "prop" the fracture open. Once the treatment is completed, the fracture closes onto the proppants which maintain the fracture open, providing a highly conductive pathway for hydrocarbons and/or other formation fluids to flow into the wellbore.

Filtrate from the fracturing fluid ultimately "leaks off" into the surrounding formation leaving a filter cake comprised of fluid additives. Such additives, including the viscosifying polymers and/or surfactants used to provide fluid viscosity, are typically too large to penetrate the permeable matrix of the formation. Recovery of the fracturing fluid is therefore an important aspect to the success of the fracturing treatment.

Recovery of the fracturing fluid is normally accomplished by reducing the viscosity of the fracturing fluid (breaking) such that the fracturing fluid flows naturally from the formation under the influence of formation fluids and pressure. Conventional oxidative breakers react rapidly at elevated temperatures, potentially leading to catastrophic loss of proppant transport. Encapsulated oxidative breakers have experienced limited utility at elevated temperatures due to a tendency to release prematurely or to have been rendered ineffective through payload self-degradation prior to release. Thus, the use of breakers in fracturing fluids at elevated temperatures, i.e., above about 120-130° F., typically compromises proppant transport and desired fracture conductivity, the latter being measured in terms of effective propped fracture length. Improvements in hydraulic fracturing techniques are required in order to increase the effective propped fracture length and thereby improve stimulation efficiency and well productivity.

Recently, fluids (such as water, salt brine and slickwater) which do not contain a viscosifying polymer have been used in the stimulation of tight gas reservoirs as hydraulic fracturing fluids. Such fluids are much cheaper than conventional fracturing fluids containing a viscosifying polymer and/or gelled or gellable surfactant. In addition, such fluids introduce less damage into the formation in light of the absence of a viscosifying polymer and/or surfactant in the fluid.

The inherent properties of fluids not containing a viscosifying polymer, such as slickwater, present however several difficulties. Foremost, such fluids provide poor proppant transport as well as poor fluid efficiency (leakoff control). Further, the low viscosity of fluids like water, salt brine and slickwater makes it difficult, if not impossible, to generate the desired fracture width. This affects the requisite conductivity of the propped fracture as proppant placement in the fracture is often not possible.

To address such limitations, "hybrid" fracturing techniques have evolved wherein a conventional gelled and/or crosslinked fracturing fluid is used as a pad fluid which precedes the introduction of a proppant laden slickwater slurry. The relatively high viscosity gelled fluid provides increased fracture width and improved fluid efficiency, thereby mitigating the limitations of slickwater. Unfortunately, however, viscosifying polymers and surfactants used in such viscosified fluids form filter cakes on fracture faces which cause conductivity damage. Since the concentration of proppant in fracturing fluids free of viscosifying polymer and viscoelastic surfactant is low and results in propped fracture widths typically no greater than one layer of proppant (±0.5 mm), any effective fracture width lost to the deposition of a filter cake often has catastrophic consequences on fracture conductivity.

Alternative hydraulic fracturing methods have therefore been sought which increase the effective propped fracture length of created fractures and which enhance fracture conductivity. Alternative methods have been particularly sought for fracturing using fluids which are free of viscosifying polymers.

SUMMARY OF THE DISCLOSURE

Effective propped fracture length is increased and fracture conductivity enhanced by pumping into a subterranean formation penetrated by a wellbore and/or the wellbore at least two separate stages. At least one of the stages is void of proppant (proppant-free) and the other stage contains proppant. One of the stages contains a viscosifying agent. The other stage contains a breaker. The breaker has the greatest affinity for the viscosifying agent which is present in the stage which does not contain the breaker. Suitable viscosifying agents include viscosifying polymers and viscoelastic surfactants. The viscosifying polymer may be a superabsorbent polymer or a synthetic polymer. Either stage may also contain a friction reducer. When present in the same stage as the breaker, the breaker exhibits little, if any, affinity towards the friction reducer.

The breaker is preferably used at a concentration sufficient to cause at least partial degradation of filter cake and to facilitate the removal of the filter cake from the fracture.

The proppant laden stage or proppant free stage or both the proppant laden stage and proppant free stage may be a foam or liquid (fresh water, salt brine or slickwater).

The methodology may be employed to create a partial monolayer propped fracture in the formation.

DETAILED DESCRIPTION OF THE PREFERRED EMBODIMENTS

The method disclosed herein includes the introduction of a proppant-free stage and a proppant laden stage into the wellbore and/or subterranean formation. Either the proppant-free stage or the proppant laden stage contains a breaker. The other stage contains a viscosifying agent to which the breaker has affinity. Such affinity renders the ability of the breaker to degrade or break down the viscosifying agent. The viscosifying agent may be a viscosifying polymer or viscoelastic surfactant. The viscosifying agent may include viscosifying polymers as well as viscoelastic surfactants which have already begun to thicken prior to being pumped into the wellbore. Suitable viscosifying polymers include superabsorbent polymers and synthetic polymers.

While the stage which contains the breaker may further contain a viscosifying agent, the breaker nonetheless has the greatest affinity for the viscosifying agent which is present in the stage not containing the breaker.

Introduction of the breaker into the wellbore and/or formation in a stage which is distinct from the stage containing the viscosifying agent (to which the breaker has the greatest affinity) increases the effective fracture width and enhances fracture conductivity within the formation.

Either the proppant-free stage or the proppant laden stage may further contain a friction reducer. When present in the same stage as the breaker, the breaker exhibits little, if any, affinity towards the friction reducer. As such, the breaker does not effectuate degradation of the friction reducer.

The proppant-free stage may be introduced prior to introduction of the proppant laden stage into the wellbore and/or formation. (It is understood that the proppant-free stage may be void of proppant or may contain a propping material but at a concentration which is insufficient for the material to function as a proppant. Alternatively, the proppant-free stage may be a pad fluid containing a high density fine particulate, such as fine mesh sand, for fluid loss control, or larger grain particulates, such as a slug of sand, to abrade perforations or near-wellbore tortuosity.) Alternatively, the proppant laden stage may be introduced into the wellbore and/or formation prior to introduction of the proppant-free stage.

The proppant-free stage or the proppant laden stage may be composed of a fluid (e.g., water, salt brine, slickwater, mineral oil or diesel oil) or be foamed.

The method disclosed herein may be practiced in a variety of manners provided that the breaker is present in a stage which is distinct from the stage which contains the viscosifying agent to which the breaker exhibits the greatest affinity. While a polymer, such as a friction reduction agent, may be present in the same stage as the breaker, it should be understood that the polymer to which the breaker has the highest affinity is present in a stage which is distinct from the stage which contains the breaker.

For example, in an embodiment of the disclosure, a hydraulic fracturing method is defined by a proppant-free stage which contains a viscosifying agent. A lower loading of viscosifying agent may be used in the proppant-free than otherwise would be possible. The proppant-free stage may be gelled and/or crosslinked. This proppant-free stage may initiate fracturing within the formation. The gelled and/or crosslinked stage often results in a filter cake deposit at the fracture face of the formation. The other stage which is introduced into the formation and/or wellbore is a proppant laden fluid. This proppant laden fluid may further contain the breaker which is capable of degrading the viscosifying agent which is present in the proppant-free stage and/or the polymer-containing filter cake as well as other solids in the proppant laden stage. The breaker in the proppant laden stage has greater affinity for the viscosifying agent in the proppant-free stage than any viscosifying agent which may be present in the proppant laden stage. If the proppant laden stage contains a friction reduction agent, the breaker has much higher affinity for the viscosifying agent in the proppant-free stage than the friction reduction agent in the proppant laden stage.

In another example, the proppant laden stage contains a viscosifying agent. The proppant laden slurry may be gelled and/or crosslinked. A second stage is free of proppant. In this embodiment, the second stage may further contain a viscosifying agent or a friction reduction polymer. The second or proppant-free stage further contains a breaker. Should the breaker exhibit any affinity for the viscosifying agent and/or friction reduction polymer which may be present in the proppant-free stage, the breaker nevertheless exhibits greater affinity for the viscosifying agent which is present in the proppant laden stage.

In yet another example of the disclosure, the proppant laden stage contains the breaker. In this example, the proppant-free stage contains a viscosifying agent and may be gelled and/or crosslinked. The proppant laden stage may further contain one or more viscosifying agents and friction reduction polymers. The breaker in this embodiment has higher affinity for the viscosifying agent in the proppant-free stage than any viscosifying agent which may be present in the proppant laden stage. When pumped into the formation and/or wellbore, the proppant-free stage initiates fractures within the formation. Subsequent to the introduction of the proppant-free stage into the formation and/or wellbore, the proppant laden stage may then be introduced. The breaker, having affinity for the viscosifying agent in the proppant-free stage degrades the viscosifying agent present in the proppant-free stage.

In another illustrative example employing the disclosure, the proppant laden stage pumped into the formation contains a viscosifying agent and the proppant-free stage contains (i) a friction reduction polymer and (ii) a breaker for the viscosifying agent of the proppant laden stage.

In a further example encompassing the disclosure, the proppant-free stage which is introduced into the formation contains a viscosifying agent and the proppant laden slurry contains (i) a friction reduction polymer and (ii) a breaker for the viscosifying agent.

In still another example of the method disclosed herein, a proppant-free gelled and/or crosslinked stage containing at least one viscosifying agent is pumped into the formation and/or wellbore and a fracture is initiated. A proppant laden stage which further contains at least one breaker is pumped into the formation and/or wellbore. A filter cake is deposited onto the fracture face of the formation, the filter cake being composed at least in part by the at least one viscosifying agent. The breaker is then instrumental in degradation of the filter cake.

Still, a proppant-free gelled and/or crosslinked stage containing a viscosifying agent may be pumped into the formation and/or wellbore and a fracture initiated, wherein the proppant-free gelled and/or crosslinked stage does not contain a breaker. The proppant laden stage is then pumped into the formation and/or wellbore which contains at least one breaker. The breaker in the proppant laden stage has greater affinity for the polymer in the proppant-free gelled and/or crosslinked stage than any polymer or viscoelastic fluid which may be present in the proppant laden stage.

In a second stage, a proppant laden stage is introduced. This stage contains a proppant and a breaker. The breaker in the proppant laden stage exhibits affinity for the viscosifying agent in the proppant-free gelled and/or crosslinked stage. In another words, the breaker in the proppant laden stage breaks or fragments the viscosifying agent in the proppant-free gelled and/or crosslinked fluid. Where the proppant laden stage contains a polymer or surfactant, such as a friction reduction agent, the breaker in the proppant laden stage nevertheless exhibits greater affinity or reactivity towards the viscosifying polymer and/or surfactant in the proppant-free gelled and/or crosslinked stage than the polymer and/or surfactant in the proppant laden stage.

The method disclosed herein has particular applicability when one of the stages does not contain any viscosifying agent. In such instances, the breaker may be present in the stage which does not contain the viscosifying agent. Alternatively, the breaker may be present in the other stage.

Either the proppant laden stage or the proppant-free stage or both the proppant laden stage and the proppant-free stage may be a foam or contain a liquid carrier. Examples of suitable liquid carriers include, but are not limited to, water, brine, water-alcohol mixtures, etc. The liquid carrier may be suitable for hydrating a hydratable polymer and/or is suitable for making a proppant slurry in the proppant laden stage.

The fluid may further be a gelled or crosslinked oil based fluids, such as those described in U.S. Pat. Nos. 3,710,865 and 4,442,897, herein incorporated herein by reference.

In an embodiment, the foamed stage may be foamed with nitrogen, carbon dioxide, natural gas or a mixture thereof.

In a preferred embodiment, the proppant-free stage is substantially non-viscosifed and is pumped into the formation prior to pumping of the proppant laden stage. In another embodiment, the proppant-free stage is viscosified, gelled or crosslinked and is pumped into the formation prior to the pumping of the proppant laden stage which is substantially non-viscosified.

The viscosifying polymer may be a thickening polymer such as a hydratable polymer like, for example, one or more polysaccharides capable of forming linear or crosslinked gels. Further, the viscosifying polymer may be one or more synthetic polymers and/or one or more viscoelastic surfactants. More than one polysaccharide, synthetic polymer or viscoelastic surfactant may be used. In addition, the viscosifying agent may be a combination of (i) one or more polysaccharides; and/or (ii) one or more synthetic polymers; and/or (iii) one or more viscoelastic surfactants. The viscosifying agent referenced herein is those which are capable of providing the requisite width to the initiated fracture.

The fluid containing the viscosifying polymer may further include a crosslinking agent.

Suitable polysaccharide hydratable polymers include galactomannan gums, guars, derivatized guars, cellulose and cellulose derivatives, starch, starch derivatives, xanthan, derivatized xanthan and mixtures thereof.

Specific examples include, but are not limited to, guar gum, guar gum derivative, locust bean gum, welan gum, karaya gum, xanthan gum, scleroglucan, diutan, cellulose and cellulose derivatives, etc. More typical polymers or gelling agents include guar gum, hydroxypropyl guar (HPG), carboxymethyl hydroxypropyl guar (CMHPG), hydroxyethyl cellulose (HEC), carboxymethyl hydroxyethyl cellulose (CMHEC), carboxymethyl cellulose (CMC), dialkyl carboxymethyl cellulose, carboxymethyl guar (CMG), etc. Other examples of polymers include, but are not limited to, phosphomannans, scerolglucans and dextrans. In a preferred embodiment, carboxymethyl hydroxypropyl guar is employed.

In a preferred embodiment, the viscosifying polymer is a guar or derivatized guar. Suitable crosslinkers for guar based polymers include borate ion donating materials. Examples of borate-based crosslinkers include, but are not limited to, organo-borates, mono-borates, poly-borates, mineral borates, etc.

A particularly preferred derivatized guar is CMHPG employed with a zirconium-based crosslinker. Such a polymer fracturing fluid is available as MEDALLION FRAC 4000 HT from Baker Hughes Incorporated. Other examples of suitable polymer fracturing fluids that may be employed include non crosslinked guar gelled water (such as AQUA FRAC), methanol crosslinked HPG (such as METHOFRAC), borate crosslinked guar (such as VIKING, VIKING D and SPECTRAFRAC G), crosslinked hydrochloric acid-based acrylic polymer (such as XL ACID II and DEEPSPOT ACID), crosslinked or viscosified hydrocarbon-based systems (such as SUPER RHEOGEL), all of the designated products being made available from Baker Hughes Incorporated.

Suitable synthetic viscosifying polymers are polyvinyl alcohols, polyacrylates, poly(meth)acrylates, polyvinylpyrrolidones, polyacrylamides, poly(meth)arylamides as well as copolymers of vinyl alcohol, acrylic acid, (meth)arylic acid, acrylamide, (meth)acrylamide, methyl propane sulfonic acid (AMPs) and ammonium or alkali metal salts of AMPs and maleic anhydride methyl vinyl ethers may be used as well as polyethylene oxides. Other comonomers may be present as well. Derivatives of such polymers/copolymers may also be used including carboxylated derivatives like carboxymethyl derivatives. The carboxyalkyl group may be bound to the backbone of the polymer or the side chain of the polymer or a combination thereof.

The weight average molecular weight of the synthetic polymer may be between from about 0.1 MMDa to about 30 MMDa, preferably between from about 0.25 MMDa to about 10 MMDa.

In an embodiment, the synthetic polymer may be a copolymer containing acrylamide and at least one of an acrylate and AMPS. Such viscosifying agents include those copolymers are of the formula:

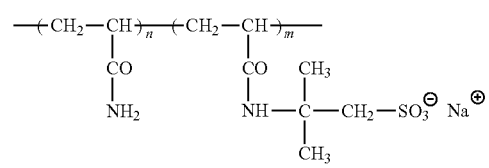

wherein m is 2 to 5 and n is 4 to 8. Exemplary of such viscosifying agents are containing from about 20 to 50% acrylamidomethylpropane sulfonic acid (AMPS), about 2 to 5% acrylic acid, and about 45 to 78% acrylamide. More preferably, the polymer comprises about 35 to 50% AMPS. In another embodiment, the copolymer may contain about 20 to about weight percent of 2-acrylamido-2-methylpropanesulfonic acid, about 2 to 5 weight percent of acrylamide, and about 45 to about 78 weight percent acrylamide and crosslinked with about 0.5 weight percent of a crosslinking agent of trimethylolpropane diallylether or polyethyleneglycol diallylether.

In one embodiment, the synthetic polymer may be a partially hydrolyzed polyacrylamide or acrylamide copolymers (such as copolymers of acrylamide and AMPS and copolymers of acrylamide and alkylacrylamides. Salts of AMPS may further be used. Partially hydrolyzed polyacrylamides are acrylamide polymers having at least 1%, but not 100%, of the acrylamide groups in the form of carboxylate groups. As used herein, "salt" includes ammonium and alkali and alkaline earth metal salts.

Other synthetic polymers may include copolymers of (i) acrylamide, (meth)acrylamide, acrylic acid, (meth)acrylic acid and/or salts thereof and (ii) N-vinylformamide, N-vinylacetamide, N-vinylcaprolactam, N-vinylimidazole, N-vinylpyridine, vinyl phosphonate, 2-acrylamido-2-methylpropanesulfonic acid, N-vinylpyrrolidone, N-methylacetamide, N,N-diallylacetamide and/or acrylamidopropyltrimonium chloride. Typically, such copolymers are comprised of two distinct monomers in a 10:90 to 90:10 weight percent ratio of acrylamide to other comonomer.

Further preferred are polyacrylic acids and salts and copolymers including those of acrylic acid, (meth)acrylic acid, alkyl acrylate and alkyl (meth)acrylate such as methyl acrylate, ethyl acrylate, propyl acrylate, butyl acrylate, octyl acrylate, dodecyl acrylate, (meth)acrylic acid, methyl (meth)acrylate, ethyl (meth)acrylate, propyl (meth)acrylate, isopropyl (meth)acrylate and/or butyl (meth)acrylate and the like. For instance, the polymers may be acrylate copolymers of $C_1$-$C_{26}$-alkyl (meth)acrylate and (meth)acrylic acid as well as (meth)acrylic acid and at least two different $C_1$-$C_{26}$-alkyl (meth)acrylate monomers. Further, the polymers may be acrylate copolymers containing acrylamide or acrylonitrile.

In another embodiment, the viscosifying polymer may be either (i) a terpolymer of N-vinylformamide, 2-acrylamido-2-methylpropanesulfonic acid and acrylamide; (ii) a copolymer of 2-acrylamido-2-methylpropane sulfonic acid and acrylamide and, optionally, N-vinylpyrrolidone; (iii) a terpolymer of acrylamidopropyl trimonium chloride, acrylamide and a nitrogen heterocyclic monomer such as N-vinylformamide, N-vinylacetamide, N-vinylcaprolactam, N-vinylimidazole, N-vinylpyridine or N-vinylpyrrolidone. Typically, each of the monomers in the copolymers is present in an amount from about 5 to about 90 weight percent. Other monomers may also be used.

The synthetic polymer may further be lightly crosslinked with a crosslinking agent, preferably those which contain two or more terminal polymerizable ethylenic groups per molecule. Examples of such crosslinking agents are N,N'-methylene-bis-acrylamide, N,N'-methylene-bis-(meth)acrylamide, diallyl amine, diallyl acrylamide, diallyl (meth)acrylamide, diallyl ether, diallyl methyl ether, divinyl benzene, diethylene glycol divinyl ether, ethylene glycol diacrylate, ethylene glycol di(meth)acrylate, propylene glycol diacrylate, propylene glycol di(meth)acrylate, diethylene glycol diacrylate, diethylene glycol di(meth)acrylate, tetraethylene glycol diacrylate, tetraethylene glycol di(meth)acrylate, allyl acrylate, allyl (meth)acrylate, trimethylolpropane diallyl ether, polyethylene glycol diallyl ether, trimethylolpropane triacrylate, trimethylolpropane tri(meth)acrylate, 1,6 hexanediol diacrylate, pentaerythritol triacrylate, glyceryl/propoxy triacrylate and the like. The crosslinking agent may further be a polyamine such as an polyallylamine, polyvinylamine, polyamidoamine, polyalkylamine and/or a polyarylamine. Typically, such crosslinking agents have a weight average molecular weight between from about 5,000 to about 150,000, preferably from about 15,000 to about 50,000.

Preferred crosslinking agents are N,N'-methylene-bis-acrylamide, trimethylolpropandiallylether and polyethyleneglycol diallylether. The amount of crosslinking agent may be varied to suit specific requirements; the amount of crosslinking agent typically varying from about 0.03 to 5.0% (by weight based on monomer). The amount of crosslinking agent typically used is between from about 0.05 to 2.0% by weight of gelling agent.

Where the polymer is not crosslinked, such as polymers containing acrylamide and/or (meth)acrylamide units, the loading of the polymer is sufficiently high to prevent the polymer from acting as a friction reducer [typically greater than 2 gallons per thousand (gpt)].

The crosslinking agent for use with the viscosifying polymers may further include metal ions such as aluminum, antimony, zirconium and titanium-containing compounds, including organotitanates. Examples of suitable crosslinkers may also be found in U.S. Pat. Nos. 5,201,370; 5,514,309, 5,247,995, 5,562,160, and 6,110,875, incorporated herein by reference.

In another embodiment, the synthetic polymer for use herein may be a superabsorbent polymer. As used herein, the term "water-superabsorbent polymer" defines a polymer capable in its dry state of absorbing and retaining a minimum of its own weight in water. In some instances, the water-superabsorbent polymer is capable of absorbing a minimum of 20, preferably 100, more preferably 700, and most preferably 1,000, times its own weight in water (i.e., 20 g to about 1,000 g of water absorbed per gram of absorbent polymer). In some instances, the superabsorbent polymer may have a water-absorbing capacity up to 2,000 times its own weight and, in other instances, about 1,500 times its own weight. Such water-absorbing properties are defined under normal conditions of temperature (25° C.) and pressure (760 mm Hg, i.e., 100,000 Pa) and generally for distilled water.

The proppant of the proppant laden stage may be disposed in the superabsorbent polymer (e.g., within a plurality of superabsorbent polymer particles). At in situ conditions, the superabsorbent polymer may be expanded such that in its expanded state, it is configured to break in response to the breaker. A plurality of proppant particles are released upon breaking of the superabsorbent polymer at in-situ conditions.

Acceptable superabsorbent polymers include those disclosed in U.S. Pat. No. 7,762,332; U.S. patent application Ser. No. 13/888,457, filed 7 May 2013; and U.S. patent application Ser. No. 14/169,698, filed 31 Jan. 2014; all of which are herein incorporated by reference.

Exemplary of such of water-superabsorbent polymers are starch-grafted polyacrylates, acrylamide/acrylic acid copolymers and salts of such polymers, starch-grafted acrylamide/acrylic acid and salts of such polymers; starch-acrylonitrile graft copolymers; homopolymers of polyacrylonitrile; isobutylene/maleic anhydride copolymers; sodium and potassium salts of carboxymethylcellulose; chitosan/polyvinylpyrrolidone and chitosan/polyethyleneimine; as well as mixtures thereof.

Suitable superabsorbents may also be some of the polymers and copolymers listed above. Exemplary superabsorbents may include acrylates such as poly 2-hydroxyethylacrylate and polyalkyl acrylates; acrylamides such as polyacrylamides and poly methacrylamides; poly vinylpyrrolidone; poly vinyl acetate; copolymers of acrylamide and maleic anhydride, vinyl acetate, ethylene oxide, ethylene glycol, acrylonitrile or a combination thereof.

Moreover, the superabsorbent polymers may be derived from one or more nonionic monomers such as acrylamide, methacrylamide and derivatives thereof such as alkyl-substituted acrylamides, aminoalkyl-substituted derivatives of acrylamide or methacrylamide (such as N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and N-tert-butylacrylamide), N-vinylformamide, N-vinylacetamide, acrylonitrile, methacrylonitrile, N,N-di($C_1$-$C_8$ alkyl) acrylamide such as N,N-dimethylacrylamide, vinyl alcohol, vinyl acetate, allyl alcohol, hydroxyethyl methacrylate, acrylonitrile, or a combination thereof.

The superabsorbent polymer may also be derived from one or more anionic and/or cationic monomers. In addition, the superabsorbent polymer may be derived from a mixture of nonionic monomers and/or anionic monomers and/or cationic monomers.

Suitable anionic monomers may include ethylenically unsaturated anionic monomers containing acidic groups including a carboxylic group, a sulfonic group, a phosphonic group, a salt thereof, a derivative thereof, or a combination thereof. In an embodiment, the anionic monomer may be acrylic acid, methacrylic acid, ethacrylic acid, maleic acid, maleic anhydride, fumaric acid, itaconic acid, α-chloroacrylic acid, β-cyanoacrylic acid, β-methylacrylic acid (crotonic acid), α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, or a combination thereof.

Examples of cationic monomers for making the superabsorbent polymer particles include an N,N-di-$C_1$-$C_8$ alkylamino-$C_1$-$C_8$ alkylacrylate (e.g., N,N-dimethyl amino ethyl acrylate), N,N-di-$C_1$-$C_8$ alkylamino-$C_1$-$C_8$ alkylmethacrylate (e.g., N,N-dimethyl amino ethyl methacrylate), including a quaternary form (e.g., methyl chloride quaternary forms), diallyldimethyl ammonium chloride, N,N-di-$C_1$-$C_8$ alkylamino-$C_1$-$C_8$ alkylacrylamide, and a quaternary form thereof such as acrylamidopropyl trimethyl ammonium chloride.

Further, the superabsorbent polymer particles may be amphoteric containing both cationic substituents and anionic substituents. The cationic substituents and anionic substituents occur in various stoichiometric proportions, including one-to-one, or one substituent is present in a greater stoichiometric amount than the other substituent. Representative amphoteric superabsorbent polymer particles include terpolymers of nonionic monomers, anionic monomers and cationic monomers.

The viscoelastic surfactant may be micellular, such as worm-like micelles, surfactant aggregations or vesicles, lamellar micelles, etc. Such micelles include those set forth in U.S. Pat. Nos. 6,491,099; 6,435,277; 6,410, 489; and 7,115,546.

Suitable viscoelastic surfactants include cationic, amphoteric and anionic surfactants. Suitable cationic surfactants include those having only a single cationic group which may be of any charge state (e.g., the cationic group may have a single positive charge or two positive charges). The cationic group preferably is a quaternary ammonium moiety (such as a linear quaternary amine, a benzyl quaternary amine or a quaternary ammonium halide), a quaternary sulfonium moiety or a quaternary phosphonium moiety or mixtures thereof. Preferably the quaternary group is quaternary ammonium halide or quaternary amine, most preferably, the cationic group is quaternary ammonium chloride or a quaternary ammonium bromide.

The amphoteric surfactant preferably contains a single cationic group. The cationic group of the amphoteric surfactant is preferably the same as those listed in the paragraph above. The amphoteric surfactant may be one or more of glycinates, amphoacetates, propionates, betaines and mixtures thereof. Preferably, the amphoteric surfactant is a glycinate or a betaine and, most preferably, the amphoteric surfactant is a linear glycinate or a linear betaine.

The cationic or amphoteric surfactant has a hydrophobic tail (which may be saturated or unsaturated). Preferably the tail has a carbon chain length from about $C_{12}$-$C_{18}$. Preferably, the hydrophobic tail is obtained from a natural oil from plants, such as one or more of coconut oil, rapeseed oil and palm oil. Exemplary of preferred surfactants include N,N,N trimethyl-1-octadecammonium chloride: N,N,N trimethyl-1-hexadecammonium chloride; and N,N,N trimethyl-1-soyaammonium chloride, and mixtures thereof.

Exemplary of anionic surfactants are sulfonates, phosphonates, ethoxysulfates and mixtures thereof. Preferably the anionic surfactant is a sulfonate. Most preferably the anionic surfactant is a sulfonate such as sodium xylene sulfonate and sodium naphthalene sulfonate.

Preferably where a mixture of surfactants are used, such as those disclosed in U.S. Pat. Nos. 6,875,728 or 6,410,489 (herein incorporated by reference), the amount of the cationic/amphoteric surfactant and the amount of anionic surfactant which are used is preferably sufficient to neutralize, or at least essentially neutralize, the charge density of the surfactants. Accordingly, if the cationic surfactant is N,N,N-trimethyl-1-octadecammonium chloride and the anionic surfactant is sodium xylene sulfonate, then the surfactants may be combined in a ratio from about 1:4 to about 4:1 by volume to obtain a clear viscoelastic gel which is capable of transporting a proppant. Typical of such viscoelastic surfactants are AquaStar, a product of Baker Hughes Incorporated.

In one preferred embodiment, a mixture of surfactants are utilized to produce a mixture of (1) a first surfactant that is one or more cationic and/or amphoteric surfactants set forth above and (2) at least one anionic surfactant set forth above.

The presence of the surfactant in either stage may be desirable for use in environments having higher leak off potential. Typically, where a surfactant is used in the one stage, it is not used in the other. For instance, where a surfactant is used in the proppant laden stage, the surfactant is not used in the proppant-free stage.

In an embodiment, a first stage may be a foam and may constitute the proppant laden stage or the proppant-free stage. Where the first stage is a foam, the second stage may likewise be a foam. Alternatively, the second stage may be a fluid or foam. Either the first stage or the second stage may contain one or more viscosifying agents. Alternatively, both the first stage and the second stage may contain one or more viscosifying agents. Thus, the viscosifying agent defined herein may be present in a foamed stage and/or in a fluid stage. The breaker may be in a foamed stage or in a fluid stage. Either stage may contain a friction reduction agent. Where a viscosifying agent is only in the proppant laden stage or the proppant-free stage, then the breaker is in the stage which does not contain the viscosifying agent. Where both the proppant laden stage and the proppant-free stage contain a viscosifying agent, then the breaker is not present in the stage having the viscosifying agent to which it has the highest affinity.

The relative amounts of the viscosifying agent in a stage containing a fluid may be determined based upon the desired viscosity of the fluid. In particular, in operation, the viscosity of the fluid may first be determined. Further, the volume of the fluid which is required may be determined at this time. The requisite amount of surfactant to obtain the predetermined viscosity may then be combined with the requisite amount of fluid.

Any breaker known in the hydraulic fracturing art may be employed. The breaker is chosen based on its affinity towards the viscosifying agent in the stage not containing the breaker. Ideally, the breaker is selected which exhibits high activity towards the stage which contains the viscosifying agent and which does not contain the breaker. The breaker is thus selected such that it is capable of degrading, enhancing the degradation of or reducing the viscosity of the viscosifying agent in the stage which does not contain the breaker. In addition, the breaker is ideally capable of degrading and/or disintegrating a filter cake.

The breaker may be a delayed acting enzyme. Encapsulated breakers are often preferred since they do not interact with other well treatment agents which may be present in the stages.

In some instances, the breaker, especially when present in the proppant laden stage, may enhance degradation of the filter cake during flow-back of proppant. As such, the breaker increases fracture conductivity within the formation.

The method provides an avenue for more efficient degradation of the filter cake via the use of a higher concentration of breaker than normally permitted for use in conventional methods. In a conventional method, the concentration of breaker which may be added into the formation is limited due to early viscosity reductions as the breaker-containing fluid becomes exposed to high temperatures. By adding the breaker in a different stage, the potential for early viscosity reduction is mitigated.

As formation fluids are recovered from the formation, they tend to flow from the reservoir or formation face into the wellbore. The removal of such fluid may be accomplished in conjunction with recovery of treatment fluids, such as by natural flow back, artificial lift, swabbing, energized flow back, jetting, etc. Further the benefits of the method disclosed herein may be realized without such recovery or flow back of treatment fluids.

Any amount or concentration of breaker suitable for degrading or reducing the viscosity of the viscosifying agent in the other stage or filter cake or other solids may further be used. Often, the concentration of breaker used in the proppant laden or proppant-free stage is that sufficient to cause complete degradation of the filter cake which is formed at the fracture face of the formation. Typically, such breakers are included in their respective stage in a concentration of between about 0.1 lb/1000 gals. and about 10 lb/100 gals.

Suitable breakers may include oils, such as mineral oil. Oil breakers have particular applicability in the breaking of surfactant-gelled fluids.

At other times, the breaker may be an enzyme or oxidative breaker and may include encapsulated breakers, delayed acting breakers, enzyme precursors as well as enzymatically catalyzed oxidizers, and chlorophyll.

Examples of suitable types of oxidizing breakers include, but are not limited to, ammonium persulfate, sodium persulfate, ammonium peroxydisulfate, encapsulated ammonium persulfate, potassium persulfate, encapsulated potassium persulfate, inorganic peroxides, sodium bromate, sodium perchlorate, encapsulated inorganic peroxides, organic peroxides, encapsulated organic peroxides, sodium perborate, magnesium perborate, calcium perborate, encapsulated sodium perborate. Specific examples of suitable oxidizing materials include, but are not limited to, breakers available from Baker Hughes Incorporated as GBW5 (ammonium persulfate), GBW7 (sodium perborate), GBW23 (magnesium peroxide), GBW24 (calcium peroxide), GBW36 (encapsulated potassium persulfate), HIGH PERM CRB (encapsulated potassium persulfate), HIGH PERM CRB LT (encapsulated persulfate), ULTRA PERM CRB (encapsulated potassium persulfate), SUPER ULTRA PERM CRB (encapsulated potassium persulfate), and TRIGINOX (organic peroxide).

Further, any enzyme suitable for degrading or otherwise reducing the viscosity of a filter cake and/or gel residue may be employed. Such enzymes include those described in U.S. Pat. Nos. 5,165,477; 5,201,370; 5,247,995; and/or 5,562,160; and/or 6,110,875.

The enzymes may be tailored to the specific viscosifying agent in the stage not containing the breaker such that the enzymes exhibit the greatest affinity for the targeted viscosifying agent. Although any suitable type of enzyme may be employed, preferred enzymes include hydrolases, lyases, transferases and oxidoreductases. More typically, hydrolases or lyases, and most typically hydrolases, are employed.

Although any hydrolase suitable for degrading and/or otherwise reducing the viscosity of a particular polysaccharide or mixture of polysaccharides may be used, most typically the following categories of hydrolases are employed. For guar containing polymeric fluids, an enzyme treatment fluid typically includes hydrolase enzymes specific to attack mannosidic and galactomannosidic linkages in the guar residue, breaking the molecules into monosaccharide and disaccharide fragments. Under some conditions, these enzymes may hydrolyze the residue completely into monosaccharide fragments. In a preferred embodiment, the breaker is a mannanase which specifically hydrolyzes the $(1,4)$-$\beta$-D-mannosidic linkages between the monosaccharide units in the viscosifying polymer. Further hydrolases include galactomannan hydrolases collectively referred to as galactomannanases and which specifically hydrolyze $(1,6)$-$\alpha$-D-galactomannosidic and the $(1,4)$-$\beta$-D-mannosidic linkages between the monosaccharide units in the guar backbone, respectively. Examples of galactomannanases include ENZYME G, from Baker Hughes Incorporated. See U.S. Pat. Nos. 5,562,160; 5,201,370; 5,514,309; 5,247,995; and 6,110,875, all of which are incorporated by reference.

Any suitable concentration of breaker may be employed. In a preferred embodiment where an aqueous carrier fluid is used, a hydrolase may be used in the range of from about 0.001 to about 0.004% by weight, based on the total weight of aqueous fluid.

In another embodiment, an enzyme for use for degrading a cellulose-containing or derivatized cellulose-containing fluid may include specific enzymes to attack glucosidic linkages of the cellulose backbone. Typically these enzymes are any enzymes or combination of enzymes suitable for attacking the glucosidic linkages of a cellulose polymer backbone and of degrading the polymer into mostly monosaccharide units including, but not limited to, cellulase, nonspecific hemicellulases, glucosidase, endo-xylanase, exo-xylanase, etc. Two typical enzymes are commonly called exo- and endo-xylanases. The most typical enzymes for use with cellulose based polymer treatment fluids specifically hydrolyze the exo(1,4)-β-D-glucosidic and endo(1, 4)-β-D-glucosidic linkages between monosaccharide units and the cellulose backbone in the (1,4)-β-D-glucosidic linkages of any cellobiose fragments. Examples of the most typical xylanases include ENZYME C, ENZYME CHT, GBW-13 and GBW-26 from Baker Hughes Incorporated. The most typical enzyme is a 1:4 (w/w) aqueous solution of exo(1,4)-β-D-xylanase and endo(1,4)-β-D-xylanase. In a preferred embodiment where an aqueous carrier fluid is used, xylanases are present in a range of from about 0.01% to about 10% by volume based on the total volume of aqueous fluid, most typically about 0.5%.

For use in the degradation of starch, the enzyme may be selected from one or more of endo-amylases, exo-amylases, isoamylases, glucosidases, α-glucosidases, glucan (1,4)-α-glucosidase, glucan (1,6)-α-glucosidase, oligo-(1,6)-glucosidase, α-glucosidase, α-dextrin endo-(1,6)-α-glucosidase, amylo-(1,6)-glucosidase, glucan-(1,4)-.alpha.-maltotetrahydralase, glucan-(1,6)-α-isomaltosidase, glucan-(1,4)-α-maltohexaosidase, etc. The most typical endo-amylase is selected based on conditions present in the formation, such as pH and temperature. The amount of enzyme used in this embodiment is the same as discussed above for the cellulose filter cake.

For use in the degradation of xanthan, hydrolases which break down the 1,4-β-D-glucosidic linkages within a cellulose backbone are typically employed. Examples include one or more of the same enzymes described above for cellulose containing proppant-free stages and mannosidase or mannan (1,2)-β-D-mannosidase.

Either the proppant laden or proppant-free stage may also contain one or more friction reduction well treatment agents. Typically, such friction reduction well treatment agents are polyacrylamides, viscoelastic surfactants, etc. When present, such friction reduction well treatment agents are at such low concentrations that any increase in viscosity attributable to them is minimal and inconsequential. Typically, such friction reduction agents do not increase the viscosity of the proppant laden stage or the proppant-free stage by any more than 1 to 2 cP.

The success of the methodology disclosed herein is dependent on the ability of the breaker to have its greater affinity for the viscosifying polymer and/or viscoelastic surfactant in the stage or fluid which does not contain the breaker. In other words, the breaker should preferably have little, if any, any affinity for any polymer (including a friction reduction well treatment agent) which is present in the same stage as the breaker.

The introduction of the proppant-free stage into the wellbore and/or formation provides a sufficient frac width which the polymer-free stage is not capable of providing. The method disclosed herein therefore provides an acceptable methodology for the stimulation of tight gas reservoirs by providing improved transport of proppant in the proppant-free stage and placement of proppant at acceptable fracture width within the formation. Further, the method disclosed herein further provides introduction of a proppant laden stage into the formation wherein the concentration of proppant in the stage is sufficient so as to achieve a partial monolayer fracture such that a partial monolayer fracture is created in the formation.

A partial monolayer of proppant provides increased interstitial spaces between proppant particulates which are desired in order to increase conductivity. The partial monolayer fracture is created by use of a reduced volume of proppant particulates in the fracture and the widely spaced proppant particulates. The produced fluids typically flow around the widely-spaced proppant particulates rather than through the interstitial spaces in a packed bed, thus providing increased fracture conductivity. The phenomena of partial monolayer fracturing has been discussed in the literature. See, for instance, Brannon et al, "Maximizing Fracture Conductivity with Partial Monolayers: Theoretical Curiosity or Highly Productive Reality" SPE 90698, presented at the SPE Annual Technical Conference and Exhibition, Houston, Sep. 26-29, 2004.

In another embodiment, the pH of the stage which contains the breaker may be modified so as to temporarily inactivate the breaker (for instance, where the breaker is an enzyme, the enzyme may be inactivated at a pH of about 10). After placement in the formation, the pH of the stage containing the breaker will tend to return to the active pH range of the breaker (enzyme).

Propping agents which may be employed in the proppant laden slurry include any propping agent suitable for hydraulic fracturing known in the art. Examples include, but are not limited to, silica, quartz sand grains, glass and ceramic beads, walnut shell fragments, aluminum pellets, nylon pellets, resin-coated sand, synthetic organic particles, glass microspheres, sintered bauxite, mixtures thereof and the like.

In a preferred embodiment, the proppant is a relatively lightweight or substantially neutrally buoyant particulate material or a mixture thereof. Such proppants may be chipped, ground, crushed, or otherwise processed. By "relatively lightweight" it is meant that the proppant has an apparent specific gravity (ASG) that is substantially less than a conventional proppant employed in hydraulic fracturing operations, e.g., sand or having an ASG similar to these materials. Especially preferred are those proppants having an ASG less than or equal to 3.25. Even more preferred are ultra lightweight proppants having an ASG less than or equal to 2.25, more preferably less than or equal to 2.0, even more preferably less than or equal to 1.75, most preferably less than or equal to 1.25 and often less than or equal to 1.05.

Such proppants include ceramics, resin coated ceramics, glass microspheres, sintered bauxite, resin-coated sintered bauxite, aluminum pellets, aluminum needles, or nylon pellets or a mixture thereof. The proppant may further be a resin coated ceramic proppant or a synthetic organic particle such as nylon pellets, ceramics (including aluminosilicates such as "CARBOLITE," "NAPLITE" or "ECONOPROP"). Suitable proppants further include those set forth in U.S. Patent Publication Nos. 2007/0209795 and 2007/0209794, herein incorporated by reference. The proppant may further be a plastic or a plastic composite such as a thermoplastic or thermoplastic composite or a resin or an aggregate containing a binder.

By "substantially neutrally buoyant", it is meant that the proppant has an ASG close to the ASG of an ungelled or weakly gelled carrier fluid (e.g., ungelled or weakly gelled completion brine, other aqueous-based fluid, or other suitable fluid) to allow pumping and satisfactory placement of the proppant using the selected carrier fluid. For example, urethane resin-coated ground walnut hulls having an ASG of from about 1.25 to about 1.35 may be employed as a substantially neutrally buoyant proppant particulate in completion brine having an ASG of about 1.2. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid. [If the ungelled carrier fluid is slickwater with a friction reducer, which is typically a polyacrylamide, there is technically 1 to as much as 8 pounds per thousand of polymer, but such minute concentrations of polyacrylamide do not impart sufficient viscosity (typically<3 cP) to be of benefit.]

Other suitable relatively lightweight proppants are those particulates disclosed in U.S. Pat. Nos. 6,364,018, 6,330,916 and 6,059,034, all of which are herein incorporated by reference. These may be exemplified by ground or crushed shells of nuts (pecan, almond, ivory nut, brazil nut, macadamia nut, etc); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have an ASG of from about 1.25 to about 1.35.

Further, the relatively lightweight particulate for use herein may be a selectively configured porous particulate, as set forth, illustrated and defined in U.S. Pat. No. 7,426,961, herein incorporated by reference.

The amount of proppant in the proppant laden stage is that amount necessary to effectuate the desired result. Typically, the amount of proppant is based on the properties of the proppant such as its apparent specific gravity, median diameter, etc.

Either the proppant-free stage or the proppant laden stage may contain other conventional additives common to the well service industry, such as surfactants, and the like.

Occasionally a spacer may be employed between the stages defined herein. Such a spacer may be employed, for example, to clean up mixing and pumping equipment. A spacer may include any fluid common to the oil treating industry, including aqueous-based fluids such as gelled water, fresh water, light brines, saturated brines, etc. Examples of other suitable spacers include, but are not limited to, oil or hydrocarbon-based fluids, gases, foams, mists, etc., although an aqueous fluid is typically employed. Examples of typical types of aqueous spacers include, but are not limited to, fresh water, sodium chloride brines, potassium chloride brines, and mixtures thereof. Furthermore, such a spacer may contain additives known in the art, including polymers. In this regard, the function of a spacer may be to help isolate the fluid containing the viscosifying agent from a breaker in the proppant laden stage, thereby preventing premature breaking or degradation of the viscosifying agent.

Although any volume of spacer suitable for separating the stages may be used, the spacer volume is typically selected based on the volume of fluid required to clean-up surface equipment (e.g., blender, lines, pumps, etc.) and wellbore tubulars.

In well stimulation treatment embodiments wherein a proppant laden slurry constitutes the proppant laden stage, pumping of the proppant laden stage may be immediately followed by a flush stage to displace the slurry into the formation. In this regard, a flush may be any suitable displacement fluid, such as one or more of those fluid types mentioned as suitable for use as spacer fluids.

The following examples are illustrative of some of the embodiments of the disclosure. Other embodiments within the scope of the claims herein will be apparent to one skilled in the art from consideration of the description set forth herein. It is intended that the specification, together with the examples, be considered exemplary only, with the scope and spirit of the disclosure being indicated by the claims which follow.

All percentages set forth in the Examples are given in terms of weight units except as may otherwise be indicated.

EXAMPLES

A standard 10 in$^2$ API fracture conductivity cell was prepared with 2 lb/ft$^2$ pack of 12/18 ceramic proppant, commercially available as CARBO LITE® from Carbo Ceramics Inc., placed between Ohio Sandstone cores. The cell was loaded onto a Dake press and subjected to a closure stress of 2,000 psi and a temperature of 195° F. Once at the required pressure and temperature, pre-conditioned de-ionized water was flowed through the proppant pack at 10 ml/min and with 300 psi back pressure.

In order to build a resilient filter cake on the faces of the sandstone core, a 25 lb./1,000 gallons zirconate crosslinked carboxymethyl guar fracturing fluid slickwater system was selected for injection into the proppant pack. More specifically, 80 ml [≈5 pore volumes (PVs)] of the crosslinked fluid were pumped through the proppant pack and at the same time allowed to leakoff through the sandstone cores to atmospheric pressure (300 psi differential), allowing the fluid to build a concentrated polymer filter cake on the faces of the core. After injection, the proppant pack and fluid were shut-in (no flow) for 24 hours before low rate water cleanup was initiated. Over several hours, water was flowed at stepped rates from 0.5 ml/min to 10 ml/min before the regain permeability and conductivity were measured and determined to be less than 1% of the original baseline.

A second conductivity test was simultaneously completed under exactly the same test conditions as above, stacked on the same press, with the same proppant and the same damaging crosslinked fluid injected with leakoff. This test showed an almost identical response to initial cleanup, with the regain being only 1% of the baseline after 72 hours of flow.

The first test was then treated with a 5 gallons per thousand (gpt) solution of Enzyme G breaker, a product of Baker Hughes Incorporated (33 parts slickwater:1 part breaker solution). In a similar manner as before, 80 ml (≈5PVs) of the enzyme solution were pumped through the proppant pack and allowed to leakoff through the sandstone cores.

The second cell was treated in an identical manner except that no breaker was added to the injected fluid. The proppant packs were then shut-in (no flow) for 24 hours. Water cleanup was again initiated at low rates and ramped from 0.5 ml/min to 10 ml/min. Differential pressure measurements within the pack indicated a significant improvement in the regain permeability and conductivity of the proppant pack containing breaker in the injection fluid. At the completion of the low rate flow stage, Test 1 was observed to exhibit 2,598 and ft conductivity compared to 1272 millidarcies feet (mD-ft) for Test 2. In the high rate flow cleanup regime, Test 1 exhibited 2941 mD-ft compared to 1,444 mD-ft for Test 2. The data is set forth in Table I below.

TABLE I

| | Conductivity After Low Rate | Conductivity After High Rate |
| --- | --- | --- |
| Test ID | 0.5 to 10 ml/min | 10-40 ml/min |
| Cell 1 - After Water Injection including enzyme breaker | 2598 mD-ft | 2941 mD-ft |
| Cell 2 - After Water Injection (Blank) | 1272 mD-ft | 1444 mD-ft |

From the foregoing, it will be observed that numerous variations and modifications may be effected without departing from the true spirit and scope of the novel concepts of the disclosure.

We claim:

1. A method of hydraulically fracturing a subterranean formation comprising:
   pumping into the formation at least two stages wherein a first stage is a proppant-free and a second stage is a proppant laden wherein:
   (a) either the first stage or second stage contains a breaker;
   (b) each of the stages contains at least one viscosifying agent, wherein the viscosifying agent is a superabsorbent polymer, a synthetic polymer or a viscoelastic surfactant and further wherein (i) the synthetic polymer is other than a superabsorbent polymer; (ii) at least one of the stages contains at least one superabsorbent polymer; and (iii) the breaker has less affinity for the viscosifying agent in the stage containing the breaker than the viscosifying agent of the other stage; and
   degrading the viscosifying agent in the stage not containing the breaker with the breaker at in-situ reservoir conditions.

2. The method of claim 1, wherein the first stage, second stage or both the first stage and second stage contain a friction reduction polymer and wherein the breaker has less affinity for the friction reduction polymer than the viscosifying agent.

3. The method of claim 1, wherein the viscosifying agent is a synthetic polymer.

4. The method of claim 3, wherein the synthetic polymer is a polyvinyl alcohol, polyacrylate, poly(meth)acrylate, polyvinylpyrrolidone, polyacrylamide, poly(meth)arylamide, polyethylene oxide, a copolymer of vinyl alcohol, acrylic acid, (meth)arylic acid, acrylamide, (meth)acrylamide, acrylamidomethylpropane sulfonic acid (AMPS), a salt of (AMPs), maleic anhydride methyl vinyl ether or a derivative thereof.

5. The method of claim 4, wherein the synthetic polymer is a copolymer of acrylamide, an acrylate and an AMPS.

6. The method of claim 1, wherein the viscosifying agent is a superabsorbent polymer.

7. The method of claim 6, wherein the superabsorbent polymer is a starch-grafted polyacrylate, acrylamide/acrylic acid copolymer, starch-grafted acrylamide/acrylic acid; starch-acrylonitrile graft copolymers; homopolymer of polyacrylonitrile; isobutylene/maleic anhydride copolymers; chitosan/polyvinylpyrrolidone; or a chitosan/polyethyleneimine or a salt thereof and mixtures thereof.

8. The method of claim 6, wherein the superabsorbent is a copolymer of an acrylic acid, (meth)acrylic acid, acrylate, (meth)acrylate, acrylamide, (meth)acrylamide, vinylpyrrolidone, vinyl acetate, ethylene glycol, acrylonitrile, methacrylonitrile, N-vinylformamide, N-vinylacetamide, vinyl alcohol, vinyl acetate, allyl alcohol, maleic acid, maleic anhydride, fumaric acid, itaconic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, acrylamidopropyl trimethyl ammonium chloride and derivatives thereof.

9. The method of claim 8, wherein the superabsorbent is a copolymer of a hydroxyethyl acrylate, hydroxyethyl(meth) acrylate, acrylamide and maleic anhydride, an alkyl-substituted acrylamide, aminoalkyl-substituted acrylamide derivative, alkyl substituted derivative of methacrylamide, aminoalkyl-substituted acrylamide derivative, or a combination thereof ethacrylic acid, α-chloroacrylic acid, β-cyanoacrylic acid, β-methylacrylic acid (crotonic acid), α-phenylacrylic acid, N,N-di-$C_1$-$C_8$ alkylamino-$C_1$-$C_8$ alkylacrylate and diallyldimethyl ammonium chloride and mixtures thereof.

10. The method of claim 6, wherein the proppant of the proppant laden slurry is disposed in the superabsorbent polymer and further wherein the proppant is released upon breaking of the superabsorbent polymer at in-situ conditions.

11. The method of claim 1, wherein the breaker is at least one enzyme or oxidative breaker.

12. The method of claim 1, wherein the proppant laden slurry is introduced into the formation at a concentration sufficient to achieve a partial monolayer propped fracture and further wherein a partial monolayer propped fracture is created in the formation.

13. The method of claim 1, wherein either the first stage or the second stage or both the first stage and the second stage are foamed.

14. A method of hydraulically fracturing a subterranean formation comprising pumping into the formation at least two stages wherein a first stage is proppant-free and a second stage is proppant laden and further wherein (i) one of the stages contains at least one superabsorbent polymer and the other stage contains a breaker; (ii) either the first stage or the second stage optionally contains a friction reduction agent; and (iii) the breaker has greater affinity for the superabsorbent polymer than the optional friction reduction agent.

15. The method of claim 14, wherein a filter cake is deposited onto the fracture face of the subterranean formation, the filter cake being composed at least in part by the at least one superabsorbent polymer and further wherein the at least one breaker degrades at least a portion of the filter cake.

16. The method of claim 14, wherein the proppant laden stage contains slickwater.

17. A method of hydraulically fracturing a subterranean formation comprising pumping into the formation at least two stages wherein a first stage is proppant-free and a second stage is proppant laden and further wherein:
   (a) at least one of the stages contains at least one first viscosifying agent and the other stage contains a breaker and optionally a second viscosifying agent;
   (b) the at least one first viscosifying agent and optional second viscosifying agent are independently selected from the group consisting of a superabsorbent polymer, a viscosifying polymer and a viscoelastic surfactant, wherein the viscosifying polymer is other than a superabsorbent polymer;

(c) at least one of the first stage or second stage is foamed; and (d) the breaker has less affinity for the optional second viscosifying agent than the at least one first viscosifying agent.

18. The method of claim 17, wherein both stages are foamed.

19. The method of claim 17, wherein the least one of the first stage or second stage is foamed with nitrogen, carbon dioxide, natural gas or a combination thereof.

20. The method of claim 17, wherein the foamed stage is the proppant laden stage.

21. The method of claim 17, wherein the foamed stage is the proppant-free stage.

22. The method of claim 17, wherein both the proppant laden stage and the proppant-free stage are foamed.

23. The method of claim 17, wherein each of the proppant laden stage and the proppant-free stage contain at least one viscosifying agent.

24. The method of claim 17, wherein either the first stage, the second stage or both the first stage and second stage contain a friction reduction agent and further wherein the breaker has less affinity for the friction reduction agent than the at least one viscosifying agent.

25. The method of claim 17, wherein a filter cake is deposited onto the fracture face of the subterranean formation, the filter cake being composed at least in part by the at least one viscosifying agent and further wherein the at least one breaker degrades at least a portion of the filter cake.

26. The method of claim 17, wherein the proppant laden stage contains slickwater.

* * * * *